United States Patent
Goerlach-Doht et al.

(10) Patent No.: US 9,359,450 B2
(45) Date of Patent: Jun. 7, 2016

(54) PROCESS FOR REDUCING THE AMOUNT OF WATER-INSOLUBLE FIBERS IN A WATER-SOLUBLE CELLULOSE DERIVATIVE

(75) Inventors: Yvonne M. Goerlach-Doht, Rosengarten (DE); Juergen Hermanns, Nottensdorf (DE); Peter E. Pierini, Lake Jackson, TX (US)

(73) Assignee: Dow Global Technologies LLC

( * ) Notice: Subject to any disclaimer, the term of this patent is extended or adjusted under 35 U.S.C. 154(b) by 247 days.

(21) Appl. No.: 14/009,430

(22) PCT Filed: Mar. 29, 2012

(86) PCT No.: PCT/US2012/031108
§ 371 (c)(1),
(2), (4) Date: Oct. 2, 2013

(87) PCT Pub. No.: WO2012/138531
PCT Pub. Date: Oct. 11, 2012

(65) Prior Publication Data
US 2014/0018531 A1 Jan. 16, 2014

Related U.S. Application Data

(60) Provisional application No. 61/472,222, filed on Apr. 6, 2011.

(51) Int. Cl.
*C08B 11/20* (2006.01)
(52) U.S. Cl.
CPC ................................ *C08B 11/20* (2013.01)
(58) Field of Classification Search
None
See application file for complete search history.

(56) References Cited

U.S. PATENT DOCUMENTS

| | | | |
|---|---|---|---|
| 4,820,813 A * | 4/1989 | Schulz | 536/84 |
| 5,482,634 A * | 1/1996 | Goerlach-Doht et al. | 210/651 |
| 5,504,201 A * | 4/1996 | Reibert | C08B 11/22 536/127 |
| 6,320,043 B1 | 11/2001 | Weber et al. | |
| 6,509,461 B2 | 1/2003 | Schlesiger et al. | |
| 7,259,257 B2 | 8/2007 | Schlesiger et al. | |
| 2001/0008048 A1 | 7/2001 | Gehrmann et al. | |

FOREIGN PATENT DOCUMENTS

| | | |
|---|---|---|
| CN | 1557864 | 12/2004 |
| DE | 102006057188 | 6/2008 |
| EP | 0954536 | 11/1999 |
| EP | 1375523 | 1/2004 |
| EP | 1127910 | 7/2005 |
| EP | 1127895 | 9/2006 |
| GB | 2262527 | 6/1993 |
| JP | 1111770 | 4/1989 |
| WO | 9924020 | 5/1999 |
| WO | 2008067930 | 6/2008 |
| WO | 2012015400 | 2/2012 |

OTHER PUBLICATIONS

Witt et al, Partec 2007, Current Limits of of Particle size.
Witt et al,Sympatec 2004, Direct Imaging.
Xing, Advances in natural cellulose solvent system, Paper and Papermaking, 2009, vol. 28, No. 12, pp. 26-31, Abstract in English.

\* cited by examiner

*Primary Examiner* — Eric Olson
*Assistant Examiner* — Dale R Miller

(57) ABSTRACT

The amount of water-insoluble fibers in a water-soluble cellulose derivative is reduced in a process comprising the steps of a) providing a water-soluble cellulose derivative having a residual amount of at least 20 ppm by weight of water-insoluble fibers in a 2 weight percent aqueous solution of the water-soluble cellulose derivative; b) mixing the water-soluble cellulose derivative of step a) with a liquid in a compounder to provide a moist water-soluble cellulose derivative having a temperature of at least 50 C and a moisture content of from 35 to 90 percent, based on the total weight of the moist cellulose derivative; and c) drying-grinding the mixture of step b) in a gas-swept impact mill to obtain a dried and ground cellulose derivative.

8 Claims, No Drawings

PROCESS FOR REDUCING THE AMOUNT OF WATER-INSOLUBLE FIBERS IN A WATER-SOLUBLE CELLULOSE DERIVATIVE

CROSS REFERENCE TO RELATED APPLICATIONS

This application is a 35 USC §371 national phase filing of PCT/US12/031108 filed Mar. 29, 2011 which claims the benefit of Application No. 61/472,222, filed Apr. 6, 2011.

FIELD

This invention relates to a process for reducing the amount of water-insoluble fibers in a water-soluble cellulose derivative, such as a cellulose ether.

BACKGROUND

Water-soluble cellulose derivatives, such as water-soluble cellulose ethers, are obtained by treating cellulose having crystalline and amorphous moieties within the molecule with a derivatizing agent, such as an etherifying agent, for converting the crystalline moieties to an amorphous state whereby the cellulose derivative is made water soluble. It is acknowledged that the crystallinity of cellulose is largely ascribed to hydrogen bonds between hydroxyl groups within the molecule which develop on the skeleton structure of cellulose molecule. Cellulose is water insoluble because the hydrogen bonds are strong enough to prevent hydration with water molecules in water. In the preparation of cellulose derivatives, such as cellulose ethers, cellulose is treated with an alkaline aqueous solution such as NaOH to convert to alkali cellulose for disrupting crystallinity, and then reacted with a derivatizing agent, such as an etherifying agent, to substitute the derivatizing agent for hydroxyl groups on the cellulose to form a cellulose derivative. Ideally the cellulose derivative can be fully dissolved in water to form a transparent aqueous solution. However, since crystallinity has not completely disappeared in the alkali cellulose, commercially available water-soluble cellulose derivatives can partially contain water-insoluble portions, which are difficult and time-consuming to remove from the water-soluble cellulose derivative, for example by filtration.

However, the residual amount of water-insoluble fibers is undesirable in many end-use applications. For example, water-soluble cellulose derivatives are used as a thickener for clear shampoo/rinses, hair conditioners, eye drops, contact lens cleaners, formulations for dipping solutions for capsule manufacture, formulations for clear tablet coatings, and the like. In these applications, products are desired to be clear. A substantial amount of water-insoluble fibers in water-based solutions of water-soluble cellulose derivatives will lead to deficient transparency. Moreover, certain cellulose ethers, such as METHOCEL™ F4M cellulose ether and METHOCEL™ A4M cellulose ether, commercially available from The Dow Chemical Company, are used as binders/plasticizers in ceramic-forming materials, such as thin-walled honeycomb structures for use as a carrier for a catalyst or a catalyst filter for exhaust gas treatment. A substantial amount of water-insoluble fibers in water-soluble cellulose ethers used as binders/plasticizers in thin-walled honeycomb structures lead to reduced stability and defects, such as pinholes, in the thin-walled honeycomb structures. Japanese Patent Application Publication JP1111770A suggests incorporating a cellulose derivative leaving ≤1,000 units of undissolved fibers having 8 to 200 μm diameter in 2 cm$^3$ of its 0.1 wt. % aqueous solution as the molding binder for ceramic material. JP1111770A discloses that when using this cellulose derivative a molded product is obtained wherein pores are not formed after sintering.

European Patent application EP 1 375 523 discloses that aqueous solutions of cellulose ethers are filtered to remove those portions which have not been dissolved on the molecular level, prior to use. However, EP 1 375 523 also discusses that in the filtering process the filter is frequently clogged, which obstructs the industrial manufacture. To solve this problem, EP 1 375 523 suggests a method of selecting as a water-soluble cellulose ether whose number of undissolved fibers having a size of 16 to 200 μm in a 0.1 wt % aqueous solution at 25° C. is up to 350 fibers/2 ml. An aqueous solution of such selected water-soluble cellulose ether is said to cause minimized clogging to a metal mesh having an opening of less than 63 μm.

However, there is a strong need not just to select cellulose ethers with a low level of undissolved fibers but to find a process for reducing the amount of water-insoluble fibers in water-soluble cellulose derivatives.

SUMMARY

Surprisingly, a process for reducing the amount of water-insoluble fibers in a water-soluble cellulose derivative has been found. It comprises the steps of
  a) providing a water-soluble cellulose derivative having a residual amount of at least 20 ppm by weight of water-insoluble fibers in a 2 weight percent aqueous solution of the water-soluble cellulose derivative;
  b) mixing the water-soluble cellulose derivative of step a) with a liquid in a compounder to provide a moist water-soluble cellulose derivative having a temperature of at least 50° C. and a moisture content of from 35 to 90 percent, based on the total weight of the moist cellulose derivative; and
  c) drying-grinding the mixture of step b) in a gas-swept impact mill to obtain a dried and ground cellulose derivative.

DETAILED DESCRIPTION

A water-soluble cellulose derivative having a residual amount of at least 20 ppm by weight of water-insoluble fibers in a 2 weight percent aqueous solution of the water-soluble cellulose derivative is used as a starting material for the process of the present invention. The residual amount of water-insoluble fibers in the water-soluble cellulose derivative in a 2 wt.-% solution of the cellulose derivative in deionized water is determined at room temperature (20° C.) by image analysis using an Optical Control Systems LA-20 Liquid Analyzer, composed of a computer system, a charge-coupled device (CCD) camera, and a 1-mm flow cell, available from Optical Control Systems, Wullener Feld 46, D-58454 Witten, Germany. The system analyzes each image or frame, determines the area of each undissolved fiber, and subsequently accumulates the data over 1500 frames to generate a relative total particle area. For determining the ppm of water-insoluble fibers from the measured relative total particle area, a series of ten aqueous suspensions of ground Cellunier-F wood pulp of defined concentrations ranging from 1000 ppm to 1 ppm is prepared and the relative total particle area of the wood cellulose fibers in each suspension is measured for calibration purposes as described above. For determining the residual amount of water-insoluble fibers in a water-soluble cellulose derivative with a nominal viscosity ranging from 1.2 to less than 20,000 mPa·s, measured in a 2 weight percent aqueous solution at 20° C., a 2 weight percent aqueous solution of the cellulose derivative is prepared and the relative total particle area of the residual cellulose fibers is measured at room temperature (20° C.) as described above. The ppm of water-insoluble fibers is determined with the aid of the series of aqueous suspensions of ground Cellunier-F wood pulp used for calibration purposes. Cellulose derivatives with nominal viscosities greater than or equal to 20,000 mPa·s are prepared and measured as 1% (wt/wt) aqueous solutions. Reported fiber content is then expressed in terms of a 2% sample solution using calculations based on the result obtained for the 1% solution.

Preferred cellulose derivatives are cellulose esters or cellulose ethers. Preferred cellulose ethers are carboxy-$C_1$-$C_3$-alkyl celluloses, such as carboxymethyl celluloses; carboxy-$C_1$-$C_3$-alkyl hydroxy-$C_1$-$C_3$-alkyl celluloses, such as carboxymethyl hydroxyethyl celluloses; $C_1$-$C_3$-alkyl celluloses, such as methylcelluloses; $C_1$-$C_3$-alkyl hydroxy-$C_{1-3}$-alkyl celluloses, such as hydroxyethyl methylcelluloses, hydroxypropyl methylcelluloses or ethyl hydroxyethyl celluloses; hydroxy-$C_{1-3}$-alkyl celluloses, such as hydroxyethyl celluloses or hydroxypropyl celluloses; mixed hydroxy-$C_1$-$C_3$-alkyl celluloses, such as hydroxyethyl hydroxypropyl celluloses, or alkoxy hydroxyethyl hydroxypropyl celluloses, the alkoxy group being straight-chain or branched and containing 2 to 8 carbon atoms. The cellulose derivatives are water-soluble, which means that they generally have a solubility in water of at least 1 gram, more preferably at least 2 grams, most preferably at least 5 grams in 100 grams of distilled water at 25° C. and 1 atmosphere.

Most preferably, the water-soluble cellulose ether is a methylcellulose with a methyl degree of substitution $DS_{methyl}$ of from 1.2 to 2.2, preferably from 1.5 to 2.0; or a hydroxypropyl methylcellulose with a $DS_{methyl}$ of from 0.9 to 2.2, preferably from 1.1 to 2.0, and an $MS_{hydroxypropyl}$ of from 0.02 to 2.0, preferably from 0.1 to 1.2; or a hydroxyethyl methylcellulose with a $DS_{methyl}$ of from 1.15 to 2.3, preferably from 1.15 to 2.2, and an $MS_{hydroxyethyl}$ of from 0.03 to 1.0, preferably from 0.05 to 0.9; or a hydroxyethyl cellulose with an $MS_{hydroxyethyl}$ of from 1.2 to 3.0, preferably from 1.45 to 2.2. The determination of the ether side groups, i.e. the $DS_{methyl}$, $MS_{hydroxyethyl}$ and $MS_{hydroxypropyl}$ can be effected as described by K. L. Ketterer, W. E. Kester, D. L. Wiederrich, and J. A. Grover, Determination of Alkoxyl Substitution in Cellulose Ethers by Zeisel-Gas Chromatographie, Analytical Chemistry, Vol. 51, No. 13, November 1979, 2172-76.

The viscosities of the water-soluble cellulose ethers can vary over a broad range. In one aspect of the present invention the viscosity of the cellulose ether is more than 150 mPa·s, preferably from 500 to 200,000 mPa·s, more preferably from 500 to 100,000 mPa·s, most preferably from 1000 to 80,000, particularly from 1000 to 60,000, determined in a 1.5% by weight aqueous solution at 20° C. in a Haake RS600 rheometer with a cone and plate Geometry (CP-60/2°) at 20° C. and at a shear rate of 2.55 $s^{-1}$. In another aspect of the present invention the viscosity of the cellulose ether is from 1.2 to 200 mPa·s, preferably from 2 to 100 mPa·s, more preferably from 2.5 to 50 mPa·s, in particular from 3 to 30 mPa·s, measured as a 2 weight-% aqueous solution at 20° C. according to ASTM D2363-79 (Reapproved 2006). Such low viscosity cellulose ethers can be produced in a known manner by partial degradation of higher viscosity cellulose ethers.

Water-soluble cellulose derivatives can be produced in a known manner. In a first step i) cellulose is treated with an alkali metal hydroxide to produce alkali cellulose. Step i) is typically conducted by intimate mixing of ground cellulose with an aqueous solution, preferably a 35 to 60 wt.-% aqueous solution, of an alkali metal hydroxide, in particular sodium hydroxide, in a mixer to give alkali metal cellulose. A known process is spray alkalization in a suitable mixing unit in which the ground cellulose is sprayed with alkali metal hydroxide solution. Alternatively, ground cellulose is suspended in a suspension medium and the alkali metal hydroxide is then added. In a slurry alkalization process, the cellulose is suspended in sodium hydroxide solution and then passed through screw presses or sieve drum presses to remove excessive caustic soda. Occasionally the treatment of the cellulose with an aqueous solution of alkali metal hydroxide does not completely eliminate the crystallinity of the cellulose. While it would be desirable to transform cellulose completely to alkali cellulose, constraints in the production process can lead to residual amounts of non-reacted cellulose. The person skilled in the art knows what reaction conditions lead to increased amounts of non-reacted cellulose, such as the way of grinding of cellulose (pulp), which can result in undesired amounts of oversize particles which do not react, dead zones in reactor, or an inhomogeneous distribution of sodium hydroxide during alkalization.

In a further step ii) the alkali cellulose is reacted with a derivatizing agent to produce a water-soluble cellulose derivative. A preferred derivatizing agent is an esterifying agent or an etherifying agent, for example an alkyl halide such as methyl chloride and/or a hydroxyalkylating agent, such as ethylene oxide and/or propylene oxide and/or butylene oxide.

In a further step iii) the produced water-soluble cellulose derivative is typically washed to remove by-products. While the preferred washing liquor may depend on the specific type of cellulose derivative, preferred washing liquors generally are water, isopropanol, acetone, methylethylketone or brine. More preferably, water or brine is used as washing liquor. Cellulose derivatives are generally washed at a temperature of from 20 to 120° C., preferably from 65 to 95° C. A solvent-moist, preferably a water-moist filter cake is obtained after washing and separating the cellulose derivative from the washing liquor. After the washing step the cellulose derivative generally has a moisture content of from 30 to 60 percent, typically from 45 to 55 percent, based on the total weight of the moist cellulose derivative. The moist cellulose derivative can be mixed with an additional amount of liquid in a step b), as described further below.

According to an alternative method, the washed, moist water-soluble cellulose derivative is not directly mixed with an additional amount of liquid in step b), but the washed, moist water-soluble cellulose derivative is subjected to a drying step and only then mixed with a liquid in step b). A partial or complete drying of the washed water-soluble cellulose derivative prior to step b) may be useful, for example, if a different washing liquor is used for washing the cellulose derivative than the liquid used in step b) or for constraints in the production process, e.g., when the washing step iii) and step b) are conducted at different locations. The washed cellulose ether can be dried in a known manner, e.g., using a contact dryer, such as a steam tube dryer, commercially available from Louisville Dryer Company (Louisville, USA) or a plate dryer, commercially available from Krauss-Maffei, Germany, to provide a water-soluble cellulose derivative that has a moisture content of generally less than 30 percent, preferably less than 20 percent, more preferably less than 10 percent, in particular less than 5 percent, based on the total weight of the moist cellulose derivative.

However, the optionally dried water-soluble cellulose derivative is preferably not subjected to a grinding step in a ball mill before the water-soluble cellulose derivative is subjected to step b) of the process of the present invention. More preferably, the water-soluble cellulose derivative is not subjected to any grinding step before the water-soluble cellulose derivative is subjected to step b) of the process of the present invention. It has surprisingly been found that the amount of water-insoluble fibers can generally be removed more efficiently in the process of the present invention if the water-soluble cellulose derivative has not been subjected to a grinding process and in particular if the water-soluble cellulose derivative has not been subjected to a grinding process in a ball mill.

In step a) of the process of the present invention a water-soluble cellulose derivative is provided which has a residual amount of at least 20 ppm, generally at least 50 ppm, typically at least 100 ppm, more typically at least 150 ppm, particularly at least 200 ppm, more particularly at least 300 ppm, and most particularly at least 500 ppm of water-insoluble fibers in a two weight percent solution of the cellulose derivative in deionized water. Typically, the water-soluble cellulose derivative has a residual amount of up to 5000, more typically of up to 2000, most typically of up to 1000 ppm of water-insoluble fibers. The residual amount of water-insoluble fibers in the produced water-soluble cellulose derivative can be measured as described further above. When using such water-soluble cellulose ethers as starting materials, a significant reduction of the amount of water-insoluble fibers can be achieved. Generally a reduction in water-insoluble fibers of at least 15 percent, typically at least 30 percent, often even at least 50 percent and under optimal conditions even at least 85 percent can be achieved. The moisture content and temperature of the water-soluble cellulose derivative provided in step a) can vary in a wide range. The moisture content of the water-soluble cellulose derivative generally is from 1 to 60 percent, typically from 2 to 55 percent, based on the total weight of the moist cellulose derivative. Its temperature generally is at least 10° C., preferably at least 20° C., and more preferably at least 40° C., and generally up to 95° C., preferably up to 85° C., and more preferably up to 75° C. The moisture content and temperature of the water-soluble cellulose derivative provided in step a) typically depend on step iii) as described above. In step b) of the present invention the water-soluble cellulose derivative provided in step a) is mixed with a liquid in a compounder in such a manner that a moist water-soluble cellulose derivative results which has a temperature of at least 50° C. and a moisture content of from 35 to 90 percent, based on the total weight of the moist cellulose derivative.

Useful liquids are, for example, water, isopropanol, acetone, methylethylketone or brine. Most preferably, water is used. The amount of liquid added to the water-soluble cellulose derivative should be adjusted to the moisture content of the cellulose derivative provided in step a). Sufficient liquid is added in step b) such that a moist water-soluble cellulose derivative results which has a moisture content of at least 35 percent, preferably at least 40 percent, and more preferably at least 50 percent, and which has a moisture content of up to 90 percent, preferably up to 85 percent, and more preferably up to 75 percent, based on the total weight of the moist cellulose derivative.

It is essential that in step b) of the process of the present invention the temperature of the water-soluble cellulose derivative is adjusted to at least 50° C., preferably at least 55° C., more preferably at least 58° C. For practical reasons the temperature of the moist water-soluble cellulose derivative is generally adjusted to not more than 95° C., preferably not more than 85° C., more preferably not more than 75° C., and most preferably not more than 70° C. Preferably the temperature of the water-soluble cellulose derivative is maintained for 10 seconds to 5 minutes, more preferably for 30 to 180 seconds, within the above-mentioned range. The temperature of the moist water-soluble cellulose derivative can be adjusted by selecting the temperature of the liquid accordingly and/or by using a compounder allowing a temperature control, e.g. using a compounder provided with a jacket. Depending on the cellulose derivative provided in step a) the temperature control in step b) may require cooling or heating. For example, if a solvent-moist, preferably a water-moist cellulose derivative is used as a starting material in step a) that has been directly obtained by washing the cellulose derivative after production with a hot washing liquor, for example having a temperature of 65 to 95° C., the cellulose derivative may be cooled, but not to a temperature of less than 50° C. If the starting material in step a) has a temperature below 50° C., it is heated to a temperature of at least 50° C. in step b). It has surprisingly been found that generally a more efficient reduction of the amount of water-insoluble cellulose fibers is achieved if the temperature of the water-soluble cellulose derivative in step b) is adjusted to at least 50° C., particularly if the water-soluble cellulose derivative is not subjected to a grinding step in a ball mill before the water-soluble cellulose derivative is subjected to step b) of the process of the present invention. A temperature of 50° C. is normally well above the thermal flocculation point of the cellulose derivative. This finding is contrary to the teaching in U.S. Pat. No. 6,320,043 wherein a cellulose derivative having a thermal flocculation point, preferably a cellulose ether, is brought into a soaked condition or in solution by cooling a water-moistened cellulose ether to a temperature below its flocculation point so that fibrous structures are largely lost and then the cellulose ether is converted in a drying-grinding device by means of superheated steam.

The compounder to be used in step b) preferably allows thorough and intense mixing. Useful compounders are, for example, granulators, kneaders, extruders, presses, or roller mills, wherein the mixture of the cellulose derivative and liquid is homogenised by applying shear forces and compounding, such as a twin-screw compounder. Co-rotating as well as counter-rotating machines are suitable. So-called divided trough kneaders with two horizontally arranged agitator blades that engage deeply with one another and that perform a mutual stripping action, as in the case of twin-screw compounders are particularly suitable. Suitable single-shaft, continuous kneaders include the so-called Reflector® compounders, which are high performance mixers of modular construction, consisting of a multi-part, heatable and coolable mixing cylinder and a unilaterally mounted blade mixer (manufacturer: Lipp, Germany). Also suitable are so-called pinned cylinder extruders or Stiftconvert® extruders (manufacturer: Berstorff, Germany). The pins incorporated in the housing serve as abutments in order to prevent the kneaded material rotating together with the shaft. Kneader mixers with so-called double-blade sigma stirrers (manufacturer: Fima, Germany) in a horizontal assembly are particularly suitable. The blades operate at different speeds and their direction of rotation can be reversed. A stirred vessel with a vertically arranged mixer shaft is also suitable if suitable flow baffles are mounted on the vessel wall in order to prevent the kneaded mass rotating together with the stirrer shaft, and in this way an intensive mixing action is imparted to the kneaded material (manufacturer: Bayer AG). Also suitable are double-walled mixing vessels with a planetary stirrer and inline homogenizer.

The mixture obtained in step b) is a moist cellulose derivative which is usually in the shape of moist granules, moist lumps and/or a moist paste. In step c) it is subjected to drying-grinding in a gas-swept impact mill, preferably an air-swept impact mill, wherein the cellulose derivative is subjected to an impacting and/or shearing stress. Preferred gas-swept impact mills are Ultra Rotor mills (Altenburger Maschinen Jaeckering, Germany) or Turbofiner PLM mills (PALLMANN Maschinenfabrik GmbH & Co. KG, Germany). Gas classifier mills are also useful gas-swept impact mills, for example, the Hosokawa Alpine Air Classifier mill—ZPS Circoplex Hosokawa Micron Ltd., Cheshire, England. Superheated vapor of a solvent, such as superheated steam, or a steam/inert gas mixture or a steam/air mixture can be used as heat-transfer gas and transport gas, as described in more detail in European Patent Applications EP 0 954 536 A1 (equivalent to U.S. Pat. No. 6,320,043) and EP 1 127 910 A1 (equivalent to U.S. Pat. No. 7,259,257). In the drying-grinding step c) of the process of the present invention the moisture content of the cellulose derivative is typically reduced to 1 to 20 percent, preferably 1 to 10 percent, more preferably 1 to 5 percent, based on the total weight of the moist cellulose derivative. The circumferential speed of the drying-grinding device is preferably controlled in a range from 35 to 140 m/s, more preferably from 45 to 110 m/s, most preferably from 55 to 105 m/s.

The dried and ground cellulose derivative is preferably subjected to gas classification, typically as described below. The finely divided solid materials may be discharged from a grinding zone of the drying-grinding device as finished product together with the transport gas. Grit content which may possibly be present can be separated from the fine material. The grit content may be returned to the grinding zone of the drying-grinding device. The finely divided solid particles are preferably separated from the flow of gas in a separator arranged down-stream the drying-grinding device. The separator is preferably designed to conduct gas classification, such as air classification. It can be a centrifugal separator such as, for example, a cyclone, or a filtering separator such as a sifter. Depending on the construction of the drying-grinding device, a gas classification may already take place in the drying-grinding device. The transport gas may be recycled to the drying-grinding device, but it is preferably filtered to remove residual amounts of water-insoluble fibers in the transport gas After drying-grinding the cellulose derivative preferably has a median particle diameter DOP (50,3) of at least 30 micrometers, more preferably at least 40 micrometers. The cellulose derivative preferably has a median particle diameter DOP (50,3) of up to 200 micrometers, more preferably up to 100 micrometers, and most preferably up to 50 micrometers. The diameter of the particles is called DOP. The DOP is preferably measured by a high speed image analysis system which combines particle size and shape analysis. This specific image analysis method is described in: W. Witt, U. Köhler, J. List, Current Limits of Particle Size and Shape Analysis with High Speed Image Analysis, PARTEC 2007.

The median particle diameter DOP (50,3) is defined as follows: All particle size distributions, e.g. the DOP can be displayed and applied as number (0), length (1), area (2) or volume (3) distribution. The volume distribution of the DOP is calculated as cumulative distribution $Q_3$. The volume distribution within the particle diameter value DOP 50,3 is designated by the number 3 after the comma. The designation 50, reflecting the median value, stands for 50% of the diameter of particle distribution being smaller than the given value in µm and 50% being larger. The 50% DOP value is calculated by the image analyzer software. A high speed image analysis system is commercially available from Sympatec GmbH, Clausthal Zellerfeld, Germany as dynamic image analysis (DIA) system QICPIC™. The system analyses the shape of the particles and takes potential curliness of the particles into account. It provides a more accurate measurement of true particle sizes than other methods. The dynamic image analysis (DIA) system QICPIC™ is described in more detail by Witt, W., Köhler, U., List, J.: Direct Imaging of very fast Particles Opens the Application of Powerful (dry) Dispersion for Size and Shape Characterization, PARTEC 2004, Nuremberg, Germany.

After drying-grinding the cellulose derivative preferably has a median particle length of at least 50 micrometers, more preferably at least 75 micrometers, and most preferably at least 100 micrometers. The cellulose derivative preferably has a median particle length of up to 2000 micrometers, more preferably up to 1500 micrometers, and most preferably up to 1000 micrometers. The length of the particle is defined as the longest direct distance between opposite ends of the particle inside the particle contour, designated as LOP (Length of Particle). "Direct" means without loops or branches. The LOP is preferably measured by a high speed image analysis system which combines particle size and shape analysis. This specific image analysis method is described in: W. Witt, U. Köhler, J. List, Current Limits of Particle Size and Shape Analysis with High Speed Image Analysis, PARTEC 2007.

The LOP (50,3) is the median length and is defined as follows: All particle size distributions, e.g. the LOP can be displayed and applied as number (0), length (1), area (2) or volume (3) distribution. Preferably the volume distribution of the LOP is calculated as cumulative distribution $Q_3$. The volume distribution within the particle length value LOP 50,3 is designated by the number 3 after the comma. The designation 50, reflecting the median value, stands for 50% of the length of particle distribution being smaller than the given value in µm and 50% being larger. The 50% LOP value is calculated by the image analyzer software. A high speed image analysis system is commercially available from Sympatec GmbH, Clausthal Zellerfeld, Germany as dynamic image analysis (DIA) system QICPIC™, as indicated above.

As stated above and as illustrated by the Examples below, generally a reduction in water-insoluble fibers of at least 15 percent, typically at least 30 percent, often even at least 50 percent and under optimal conditions even at least 85 percent can be achieved by the process of the present invention. Due to the low residual amount of water-insoluble fibers, clear aqueous solutions can be prepared from the water-soluble cellulose derivatives produced according to the process of the present invention. Accordingly, the water-soluble cellulose derivatives produced according to the process of the present invention are highly useful as thickeners in personal care applications, particularly in fluid personal care compositions of high clarity or transparency, such as clear shampoo/rinses, hair conditioners, eye drops, contact lens cleaners, and the like or as adjuvants in health care applications, such as dipping solutions for capsule manufacture, or in formulations for clear tablet coatings, and the like. Preferred water-soluble cellulose derivatives in such health care applications are water-soluble cellulose ethers, more preferably methyl cellulose or hydroxypropyl methylcellulose which have been produced according to the process of the present invention and which have a viscosity of from 2 to 200 mPa·s, more preferably from 2 to 100 mPa·s, most preferably from 2.5 to 50 mPa·s, in particular from 3 to 30 mPa·s, determined in a 2% by weight aqueous solution at 20° C. according to ASTM D2363-79 (Reapproved 2006). Particularly preferred in such health care applications are cellulose ethers which have been produced as the commercially available material METHOCEL™ A15 Premium LV methylcellulose, METHOCEL™ E5 Premium LV hypromellose, METHOCEL™ E15 Premium hypromellose, or K3 Premium LV) hypromellose and which have not been subjected to a grinding step after production but are directly subjected to the process of the present invention. Clear capsules or tablet coatings of high transparency can be produced.

Moreover, water-soluble cellulose derivatives, preferably water-soluble cellulose ethers, more preferably methyl cellulose or hydroxypropyl methylcellulose which have been produced according to the process of the present invention and which have a viscosity of more than 150 mPa·s, preferably from 500 to 200,000 mPa·s, and more preferably from 1000 to 80,000, determined in a 1.5% by weight aqueous solution at 20° C. in a Haake RS600 rheometer with a cone and plate Geometry (CP-60/2°) at 20° C. and at a shear rate of 2.55 s$^{-1}$ are particularly useful as binders/plasticizers in ceramic-forming materials, such as thin-walled honeycomb structures for use as a carrier for a catalyst or a catalyst filter for exhaust gas treatment. Particularly preferred as binders/plasticizers in such ceramic-forming materials are cellulose ethers which have been produced as the commercially available material METHOCEL™ F4M cellulose ether or METHOCEL™ A4M cellulose ether, and which have not been subjected to a grinding step after production but are directly subjected to a process of the present invention. Thin-walled honeycomb structures of high stability and very few defects, such as pinholes, can be produced using such water-soluble cellulose derivatives as binders/plasticizers.

EXAMPLES

The following examples are for illustrative purposes only and are not intended to limit the scope of the present invention. Unless otherwise mentioned, all parts and percentages are by weight.

Examples 1-7

A commercially available continuous compounder with heating and cooling jacket was used to add water to dry METHOCEL™ E10M cellulose ether as feedstock material. METHOCEL™ E10M cellulose ether has a degree of substitution of methoxyl groups of 28-30% and of hydroxypropoxyl groups of 7-12%, a viscosity of 10,000 mPa·s, measured as a 2 percent aqueous solution at 20° C., and a moisture level of less than 3%. The cellulose ether of examples 1-5 was produced as the commercially available material METHOCEL™ E10M cellulose ether, but it was used in Examples 1-5 without having been ground after production. The cellulose ether of examples 6-7 was produced as the commercially available material METHOCEL™ E10M cellulose ether and was ground in a ball mill after production. The compounder jacket was supplied with a fluid of −10° C. to 80° C. The cellulose ether was fed continuously at a feed rate of 30 kg/h into the compounder. Water of a temperature of 0° C. to 60° C. was continuously added at rates of 33-71 kg/h to the compounder resulting in a moisture level of about 54-72%. The wet product was transported continuously via a transport belt into a mill feed unit (Altenburger Maschinen Jaeckering GmbH, Hamm, Germany). The bottom blades of the vessel agitator pressed the paste into a single augur screw mounted at the bottom of the vessel. The wet product was forced through a perforated plate directly into the side of an Ultrarotor II "S" gas-swept impact mill (Altenburger Maschinen Jaeckering GmbH, Hamm, Germany) between the first and second grinding stage. The mill was equipped with seven grinding stages. The bottom three grinding stages were equipped with standard grinding bars. Turbo-bars were installed in the top four grinding stages. A co-rotating finger sifter wheel with twelve blades was installed on the top of the 7th grinding stage. The interior of mill jacket had the standard Altenburger corrugated stationary grinding plates.

The rotor of the impact mill was operated at a circumferential speed of 80-114 m/s. A hot gas stream, i.e. nitrogen was fed with 1000-1400 m$^3$/h into the bottom of the mill A cyclone was used to separate the dried product from the nitrogen. The final product moisture was less than 1.1-2.3% by weight.

The processing conditions and the amount of water-insoluble fibers in the water-soluble cellulose derivative are listed in Table 1 below. The results in Table 1 illustrate that a more efficient fiber reduction is achieved if the water-soluble cellulose derivative has not been subjected to a grinding process in a ball mill before it is subjected to steps b) and c) of the process of the present invention (Examples 1-5) than if it has been subjected to intermediate grinding in a ball mill (Examples 6-7). If the water-soluble cellulose derivative has not been subjected to a grinding process in a ball mill (Examples 1-5), a considerably more efficient fiber reduction is achieved if the moist water-soluble cellulose derivative prior to the drying-grinding step c) of the present invention has a temperature of at least 50° C. In all examples and comparative examples a fiber reduction is achieved.

TABLE 1

| (Comparative) Example | Moisture % | Temperature prior to dry grinding ° C. | Water Temperature, ° C. | Jacket Temperature, ° C. | Gas Flow Mill, m$^3$/h | Tip Speed, m/s | Fibers in Feed Stock, ppm | Fibers in end-product, ppm | Fiber Reduction |
|---|---|---|---|---|---|---|---|---|---|
| 1 | 63 | 60 | 55 | 68 | 1005 | 86 | 568 | 140 | 75% |
| 2* | 63 | 18 | 5 | −10 | 1293 | 114 | 568 | 335 | 41% |
| 3 | 70 | 59 | 55 | 60 | 1013 | 114 | 568 | 152 | 73% |
| 4 | 63 | 64 | 55 | 67 | 973 | 79 | 568 | 107 | 81% |
| 5 | 72 | 66 | 60 | 68 | 1044 | 89 | 568 | 74 | 87% |
| 6* | 74 | 15 | 5 | −1 | 1388 | 114 | 574 | 478 | 17% |
| 7 | 74 | 59 | 5 | 66 | 1393 | 114 | 574 | 495 | 14% |

*Comparative Example

The invention claimed is:

1. A process for reducing the amount of water-insoluble fibers in a water-soluble cellulose derivative comprising the steps of
   ai) treating cellulose with an alkali metal hydroxide to produce alkali cellulose,
   aii) reacting the alkali cellulose with a derivatizing agent to produce a water-soluble cellulose derivative, and
   aiii) washing the water-soluble cellulose derivative with a washing liquor having a temperature of 65 to 95° C. to remove by-products with or without a subsequent drying step but in the absence of a grinding step, to provide a water-soluble cellulose derivative having a residual amount of at least 20 ppm by weight of water-insoluble fibers in a 2 weight percent aqueous solution of the water-soluble cellulose derivative;

b) mixing the water-soluble cellulose derivative of step a) with a liquid in a compounder to provide a moist water-soluble cellulose derivative having a temperature of at least 55° C. and up to 75° C. and a moisture content of from 50 to 75 percent, based on the total weight of the moist cellulose derivative; and c) drying-grinding the mixture of step b) having a temperature of at least 55° C. and up to 75° C. in a gas-swept impact mill to obtain a dried and ground cellulose derivative, wherein the water-soluble cellulose derivative is a methylcellulose or a hydroxypropyl methylcellulose.

2. The process of claim 1 wherein in step iii) the water-soluble cellulose derivative is washed with a washing liquor to provide a water-soluble cellulose derivative having a moisture content of from 30 to 60 percent, based on the total weight of the moist cellulose derivative, and is mixed with an additional amount of liquid in step b).

3. The process of claim 1 wherein in step iii) the water-soluble cellulose derivative is washed with a washing liquor and subjected to drying to provide a water-soluble cellulose derivative having a moisture content of less than 30 percent, based on the total weight of the moist cellulose derivative, and is mixed with a liquid in step b).

4. The process of claim 1 wherein in step iii) the water-soluble cellulose derivative is washed with water.

5. The process of claim 1 wherein the water-soluble cellulose derivative has a residual amount of at least 150 ppm of water-insoluble fibers.

6. The process of claim 1 wherein the water-soluble cellulose derivative of step a) is mixed in step b) with a liquid in a compounder to provide a moist water-soluble cellulose derivative having a temperature of at least 58° C.

7. The process of claim 1 wherein in step b) aqueous liquid is used.

8. The process of claim 1 wherein the dried and ground cellulose derivative is subjected to gas classification.

* * * * *